United States Patent
Tsujimoto

[19]

[11] Patent Number: 6,163,142
[45] Date of Patent: *Dec. 19, 2000

[54] CURRENT-MODE CONTROLLER FOR SWITCHING DC/DC CONVERTER HAVING A REDUCED OUTPUT RIPPLE CURRENT

[75] Inventor: Hirokazu Tsujimoto, Aichi, Japan

[73] Assignee: Kabushiki Kaisha Toyoda Jidoshokki Seisakusho, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/348,588

[22] Filed: Jul. 6, 1999

[30] Foreign Application Priority Data

Jul. 8, 1998 [JP] Japan ................... 10-192200

[51] Int. Cl.$^7$ ........................................ G05F 1/40
[52] U.S. Cl. ................................ 323/283; 323/284
[58] Field of Search .................. 323/283, 282, 323/284

[56] References Cited

U.S. PATENT DOCUMENTS

| | | | |
|---|---|---|---|
| 5,418,178 | 5/1995 | Shoji | 437/52 |
| 5,705,919 | 1/1998 | Wilcox . | |
| 5,731,694 | 3/1998 | Wilcox et al. | 323/287 |
| 5,959,443 | 9/1999 | Littlefield | 323/287 |
| 5,973,485 | 10/1999 | Kates et al. | 323/272 |
| 5,994,885 | 11/1999 | Wilox et al. | 323/285 |

FOREIGN PATENT DOCUMENTS

| | | |
|---|---|---|
| 7-46828 | 2/1995 | Japan . |
| 9-135568 | 5/1997 | Japan . |

OTHER PUBLICATIONS

"High Efficiency Low Noise Synchronous Step–Down Switching Regulator", Linear Technology, Initial Release, Final Electrical Specifications, LTC1435, Apr. 1996 p. 1–16.
"Dual–Output Power–Supply Controller for Notebook Computers", MAX786, MAXIM, Maxim Integrated Products, 19–0160; Rev 1; May 1994 p. 1–24.

*Primary Examiner*—Shawn Riley
*Attorney, Agent, or Firm*—Woodcock Washburn Kurtz Mackiewicz & Norris LLP

[57] ABSTRACT

A switch arranged between a DC power supply source and a load is driven depending on the state of a flip-flop circuit. An error amplifier outputs an instruction value signal determined based on an output voltage. A comparator outputs a first reset signal when an inductor current reaches the instruction value signal. An oscillator generates a set pulse. A first AND gate feeds as a second reset signal an AND-operation result between the Q-output of the flip-flop circuit and the first reset signal to the reset terminal of the flip-flop circuit and the negative logic input terminal of a second AND gate. The second AND gate feeds the set pulse to the set terminal of the flip-flop circuit according to the second reset signal.

10 Claims, 8 Drawing Sheets

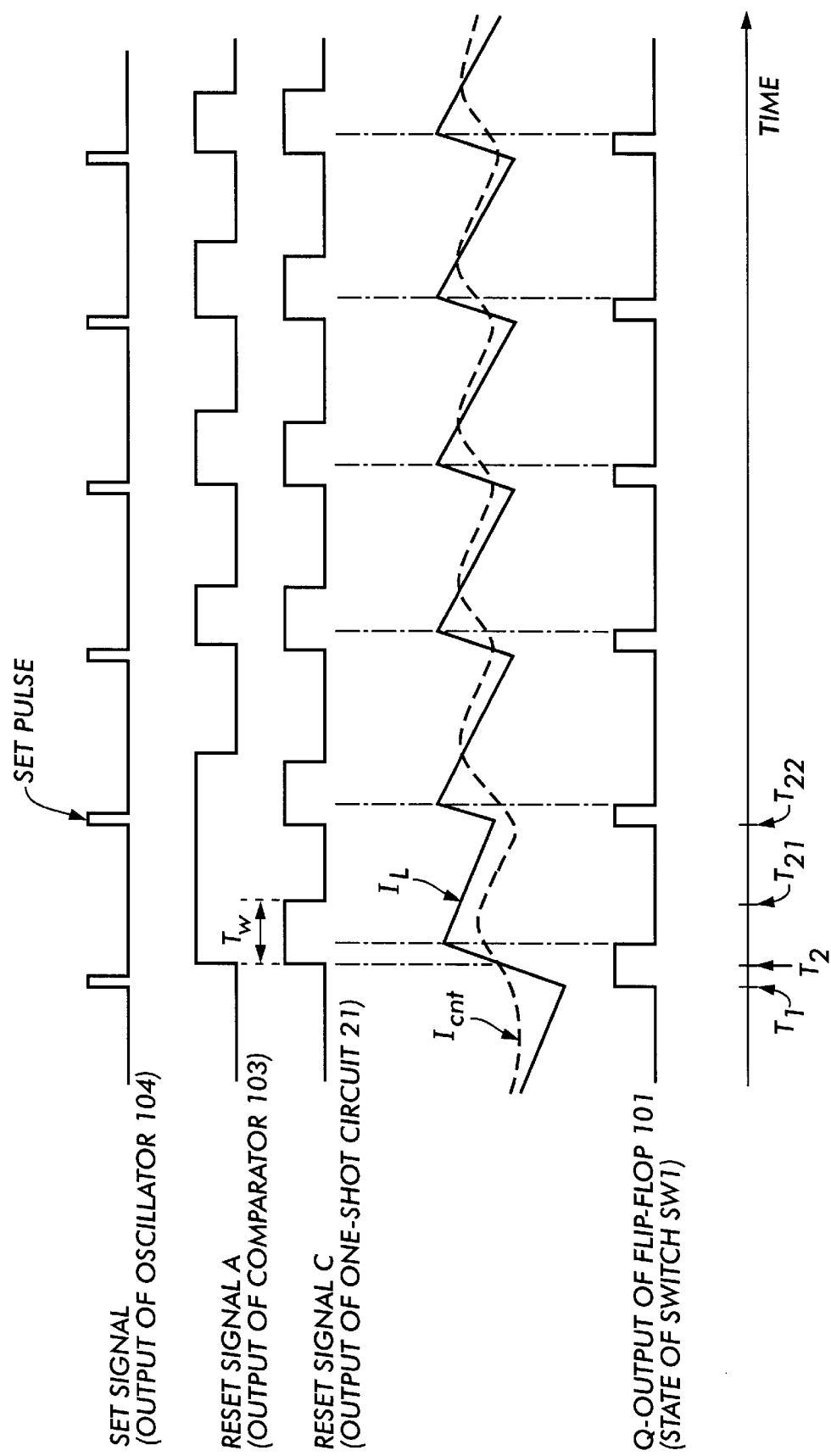

CURRENT-MODE CONTROLLER FOR SWITCHING DC/DC CONVERTER HAVING A REDUCED OUTPUT RIPPLE CURRENT

BACKGROUND OF THE INVENTION

1. Field of the Invention

The present invention relates to a DC/DC converter and a controlling method thereof, and more particularly to a DC/DC converter of current-mode control.

2. Description of the Related Art

A DC/DC converter is a device for converting a applied DC voltage into a higher/lower DC voltage, and is used in various fields.

FIG. 1 is a circuit diagram exemplifying a conventional DC/DC converter. This DC/DC converter is operated with a PWM (Pulse Width Modulation) method, and sometimes referred to as a switching regulator. This DC/DC converter monitors an electric current flowing through an inductor, and regulates an output DC voltage based on the monitored current.

A switch SW is, for example, a MOS transistor, to which an input voltage $V_{in}$ is applied. The switch SW is turned on (ON state) or turned off (OFF state) depending on the state of a flip-flop 101. An inductor current IL flowing via an inductor L approximately linearly increases while the switch SW is in the ON state (ramp-up), and approximately linearly decreases while the switch SW is in the OFF state (ramp-down).

A diode D is arranged to make an electric current flow when the switch SW is in the OFF state. Also the configuration where a MOS transistor, etc. is used as a replacement of the diode D is known. The configuration where a MOS transistor, etc. is used as a replacement of the diode D is sometimes called a synchronously rectifying type. An output capacitor $C_{out}$ is arranged to smooth an output voltage $V_{out}$.

In this DC/DC converter, the output voltage $V_{out}$ and the inductor current IL are used as feedback signals. An error amplifier 102 amplifies a difference between the output voltage $V_{out}$ (more precisely, a voltage obtained by dividing the output voltage $V_{out}$ with a resistor network composed of resistors R1 and R2) and a predetermined reference voltage $V_{ref}$, and outputs the result of the amplification as an instruction value signal $I_{cnt}$. A comparator 103 makes a comparison between the inductor current IL (more precisely, the voltage corresponding to the inductor current IL) and the instruction value signal $I_{cnt}$ output from the error amplifier 102. Then, the comparator 103 outputs the result of the comparison as a reset signal.

An oscillator 104 generates a set signal. The set signal is a pulse signal which is synchronous with an oscillation frequency of the oscillator 104. The set signal is input to the set terminal of the flip-flop 101 via an AND gate (an AND gate one of whose inputs is a negative logic) 105, while the reset signal from the comparator 103 is input to the reset terminal of the flip-flop 101.

The operations of the DC/DC converter having the above described configuration are explained below. Upon receipt of the set pulse from the oscillator 104, the flip-flip 101 is set. When the flip-flop 101 enters the set state, the switch SW is turned on, which leads to an increase in the inductor current IL. When the inductor current IL reaches the instruction value signal $I_{cnt}$ being the output of the error amplifier 102, the output of the comparator 103 is changed from "L" to "H". The output of the comparator 103 is applied to the reset terminal of the flip-flop 101.

Upon receipt of "H" at the reset terminal, the flip-flop 101 is reset. When the flip-flop 101 enters the reset state, the switch SW is turned off, which leads to a decrease in the inductor current IL. The next set pulse is then generated by the oscillator 104. When the set pulse is input to the set terminal of the flip-flop 101, the above described operations are repeated.

As described above, in the DC/DC converter shown in FIG. 1, the output voltage $V_{out}$ is held constant by controlling the inductor current IL with the instruction value signal $I_{cnt}$ which varies according to the output voltage $V_{out}$. The output voltage to be held by this DC/DC converter is determined by the reference voltage $V_{ref}$.

In the above described DC/DC converter, the state of the switch SW is switched from ON to OFF, when the inductor current IL reaches the instruction value signal $I_{cnt}$ as described above. Actually, however, the A switch SW is turned off after a predetermined amount of time elapses from when the inductor current IL reaches the instruction value signal $I_{cnt}$. This is because of a delay in a circuit.

FIG. 2 explains the operations and the problems of the DC/DC converter shown in FIG. 1.

The set pulse of the set signal is output at a time $T_1$, and input to the set terminal of the flop-flop 101. Here, the AND gate 105 is assumed to be open at the time $T_1$.

The flip-flop 101 is set according to the set pulse. When the flip-flop 101 enters the set state, the switch SW is turned on, which leads to an increase in the inductor current IL, as described above. When the inductor current IL reaches the instruction value signal $I_{cnt}$ at a time $T_2$, the output (reset signal) of the comparator 103 is changed from "L" to "H" at the time $T_2$.

When the reset signal becomes "H", the flip-flop 101 enters the reset state. As a result, the switch SW is turned off. When the switch SW is turned off, the inductor current IL starts to decrease.

As described above, however, a delay occurs on the path over which the signals are transmitted. In this case, the comparator 103 and the flip-flop 101 cause the delay. Therefore, the switch SW is actually turned off after a predetermined amount of time (delay time td) elapses from when the inductor current IL reaches the instruction value signal $I_{cnt}$ at the time $T_2$. As a result, the inductor current IL continues to increase between the times $T_2$ and $T_3$. That is to say, the inductor current IL becomes larger than needed due to the above described delay.

The increasing rate (di/dt) of the inductor current IL while the switch SW is in the ON state depends on the inductance of the inductor L, the input voltage $V_{in}$, and the output voltage $V_{out}$.

$$di/dt \; (V_{in}-V_{out})/L \qquad (1)$$

However, the increasing rate of the inductor current IL while the switch SW is in the ON state has been becoming higher in recent years. That is, in these years, the voltage required by a load (such as a CPU used in a personal computer, etc.) has been dropping year by year. As a result, the output voltage $V_{out}$ of the DC/DC converter is set to a lower value more frequently than before. In this case, the increasing rate of the inductor current IL becomes higher as is evident from the above provided equation (1). Additionally, the inductance of the inductor L must be made smaller as the current required by a load becomes larger. Also in this case, the increasing rate of the inductor current IL rises as is evident from the above provided equation (1).

If the increasing rate of the inductor current IL is high, the inductor current IL sharply increases. As a result, the inductor current IL becomes much larger than the instruction value $I_{cnt}$ at the timing (time $T_3$) when the switch SW is turned off.

When the switch SW is turned off at the time $T_3$, the inductor IL gradually decreases thereafter. The decreasing rate (di/dt) of the inductor current IL is represented by the following equation (2). Particularly, when the output voltage $V_{out}$ of the DC/DC converter is set to a small value, the decreasing rate is low.

$$di/dt = -V_{out}/L \qquad (2)$$

The oscillator 104 generates the next set pulse at a time $T_4$. The inductor current IL, however, is much larger than the instruction value $I_{cnt}$ at the time $T_3$, and its decreasing rate IL after the time $T_3$ is low. Accordingly, the inductor current IL may sometimes remain larger than the instruction value $I_{cnt}$.

If the inductor current IL is larger than the instruction value $I_{cnt}$, the output (reset signal) of the comparator 103 is "H". Consequently, the AND gate 105 remains closed according to the reset signal at the time $T_4$.

While the AND gate 105 is closed, the set pulse generated by the oscillator 104 is blocked by the AND gate 105. That is to say, the flip-flop 101 cannot receive the set pulse that should be received at the time $T_4$ if the AND gate 105 were open. Therefore, the inductor current IL continues to decrease after the time $T_4$.

The oscillator 104 further generates the next set pulse at a time $T_5$. At this time, the inductor current IL is smaller than the instruction value $I_{cnt}$. If the inductor current IL is smaller than the instruction value $I_{cnt}$, the output (reset signal) of the comparator 103 is "L", which opens the AND gate 105. Namely, the set pulse can pass through the AND gate 105 at the time $T_5$. Accordingly, the flip-flop 101 enters the set state according to the set pulse at the time $T_5$, and the switch SW is turned on. Thereafter, the inductor current IL continues to increase until the flip-flop 101 is reset.

The above described DC/DC converter gives a higher priority to the reset signal over the set signal as the input signal of the flip-flop 101. This is intended to prevent an overcurrent, etc., and is implemented by the AND gate 105.

In the conventional DC/DC converter, the set pulse for turning on the switch SW is sometimes blocked by an influence of a circuit delay as described above. In the example shown in FIG. 2, the switch SW is not turned on at the time $T_4$ although it should be originally turned on at the times $T_1, T_4, T_5, \ldots$.

If the switching interval becomes longer as described above, the ripple of the output voltage $V_{out}$ naturally becomes larger. Since the allowable value of the ripple, which is demanded by the load, has recently become strict, it is vital to reduce the ripple of the output voltage of the DC/DC converter.

Additionally, when the switching frequency (or a switching interval) of the switch SW changes, the frequency of noise caused by the switching also varies with its change. To suppress the noise output from the DC/DC converter in this case, the rejection bandwidth of the filter for eliminating noise must be broadened. However, because such a filter costs high or its size is large, it is not preferable.

SUMMARY OF THE INVENTION

An object of the present invention aims at solving the above described problems, and at providing a DC/DC converter with a stable output voltage and a small ripple.

The DC/DC converter according to the present invention includes a power supply switch and an inductor arranged between the power supply switch and an output terminal, and comprises: a latch circuit which holds either a first state intended to turn on the power supply switch or a second state intended to turn off the power supply switch; a set signal generating circuit which generates a set signal intended to make the latch circuit enter the first state; a reset signal generating circuit which generates a reset signal intended to make the latch circuit enter the second state when an electric current flowing via the inductor becomes larger than an instruction value determined based on an output voltage; and a canceling circuit which cancels the reset signal immediately after a state held by the latch circuit is changed from the first state to the second state.

When the latch circuit switches from the first state to the second state in the above described configuration, the power supply switch is turned off, and at the same time, the reset signal is canceled. Thereafter, the latch circuit enters the state where the set signal can be received. Accordingly, when the set signal is generated in this state, the latch circuit returns from the second state to the first state and the power supply switch is turned on. As a result, the power supply switch performs switching in synchronization with the set signal generated by the set signal generating circuit.

BRIEF DESCRIPTION OF THE DRAWINGS

FIG. 8 explains the operations of the DC/DC converter shown in FIG. 7.

DESCRIPTION OF THE PREFERRED EMBODIMENTS

Figure 3:
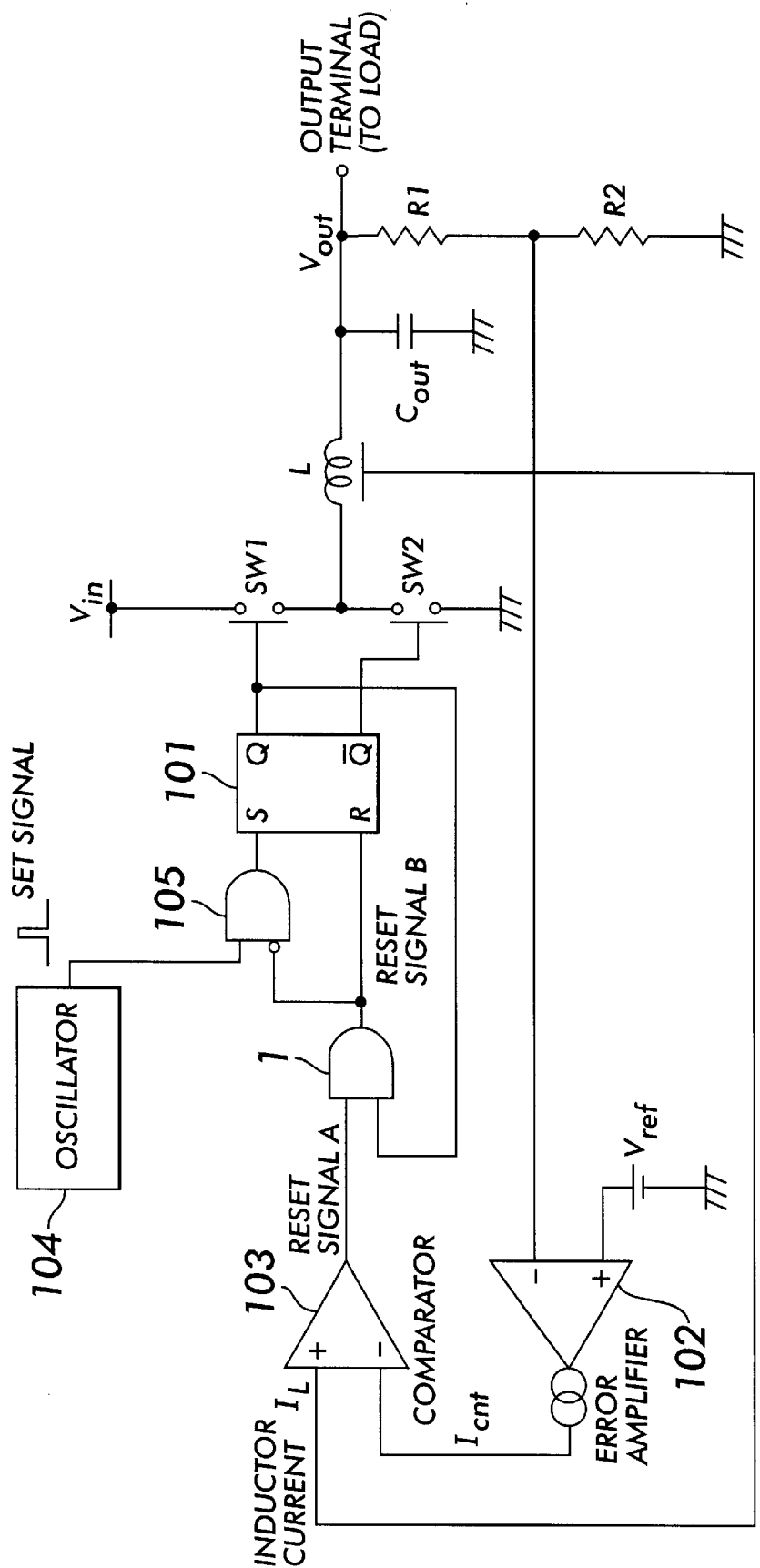
FIG. 3 is a circuit diagram showing the configuration of a DC/DC converter according to a preferred embodiment of the present invention.

FIG. 3 is a circuit diagram showing the configuration of a DC/DC converter according to a preferred embodiment of the present invention. In this figure, the same reference numerals as those used in FIG. 1 indicate the same constituent elements.

Figure 1:
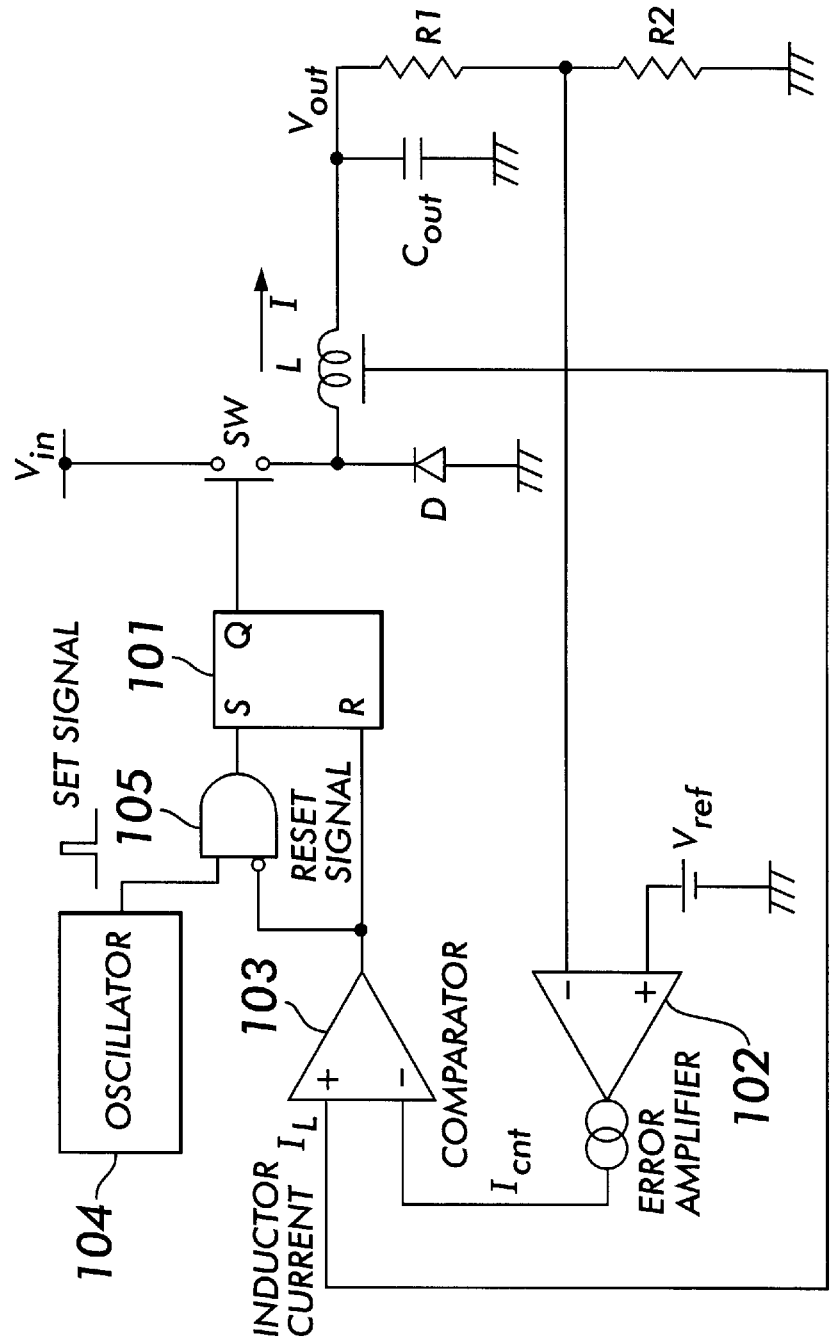
FIG. 1 is a circuit diagram exemplifying the configuration of a conventional DC/DC converter.
Figure 2:
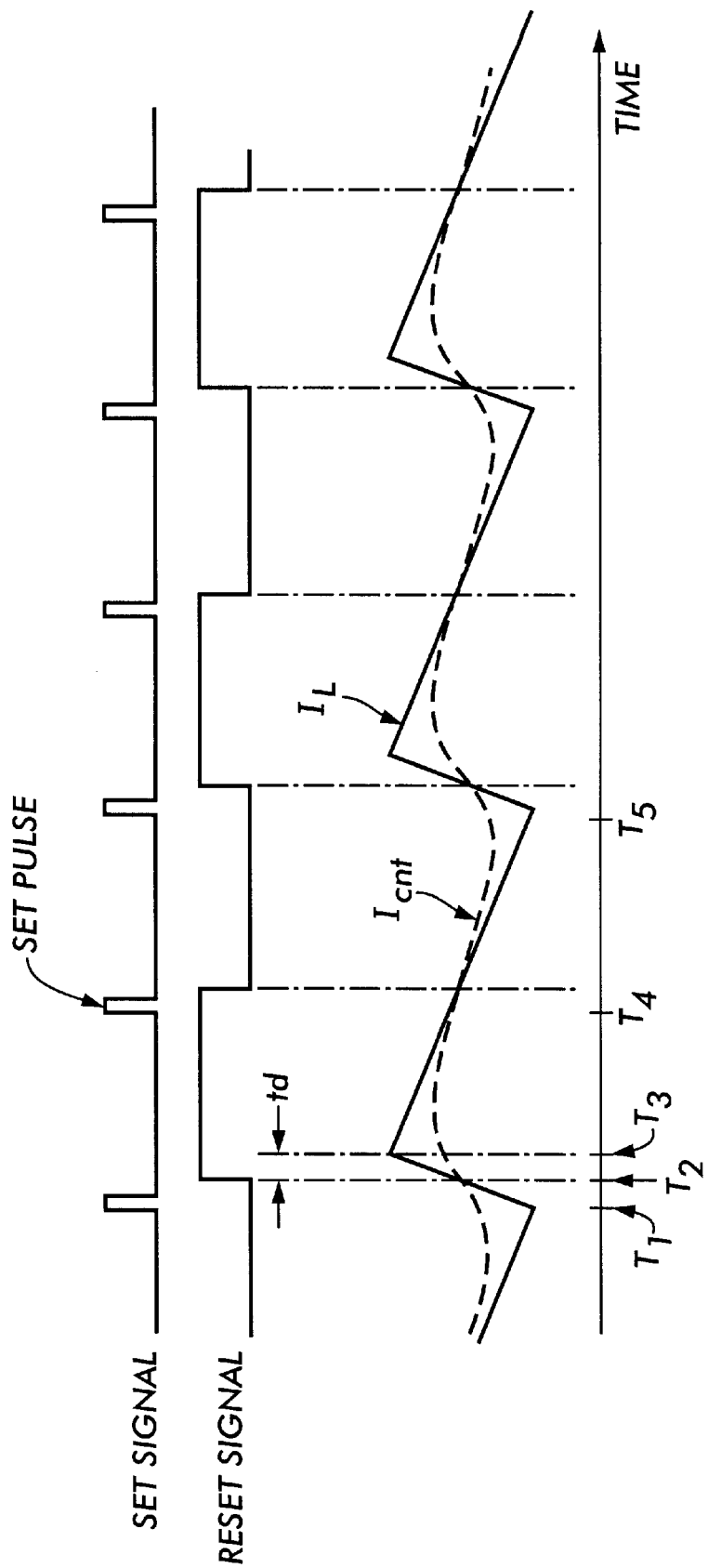
FIG. 2 explains the operations and the problems of the DC/DC converter shown in FIG. 1.

The DC/DC converter according to this preferred embodiment is fundamentally implemented by adding an AND gate 1 to the DC/DC converter shown in FIG. 1. The DC/DC converter according to this preferred embodiment comprises a pair of switches SW1 and SW2, and is sometimes called a switching regulator of a synchronously rectifying type. The switch SW1 is controlled by the Q-output of the flip-flop 101, while the SW2 is controlled by the /Q-output of the flop-flop 101. Namely, the switches SW1 and SW2 are controlled to be alternately turned on and off.

One of the input terminals of the AND gate 1 is connected to the output of the comparator 103, while the other is connected to the Q-output of the flop-flop 101. Furthermore, the output of the AND gate 1 is connected to the reset terminal of the flip-flop 101 and the negative logic input terminal of the AND gate 105. Namely, the AND gate 1 performs an AND operation between the reset signal generated by the comparator 103 and the control signal for driving the switch SW1, which is the Q-output of the flip-flop 101, and outputs the result of the AND operation to the reset terminal of the flip-flop 101 and the negative logic input terminal of the AND gate 105. Hereinafter, the outputs of the comparator 103 and the AND gate 1 are referred to as "reset signal A" and "reset signal B", respectively.

Figure 4:
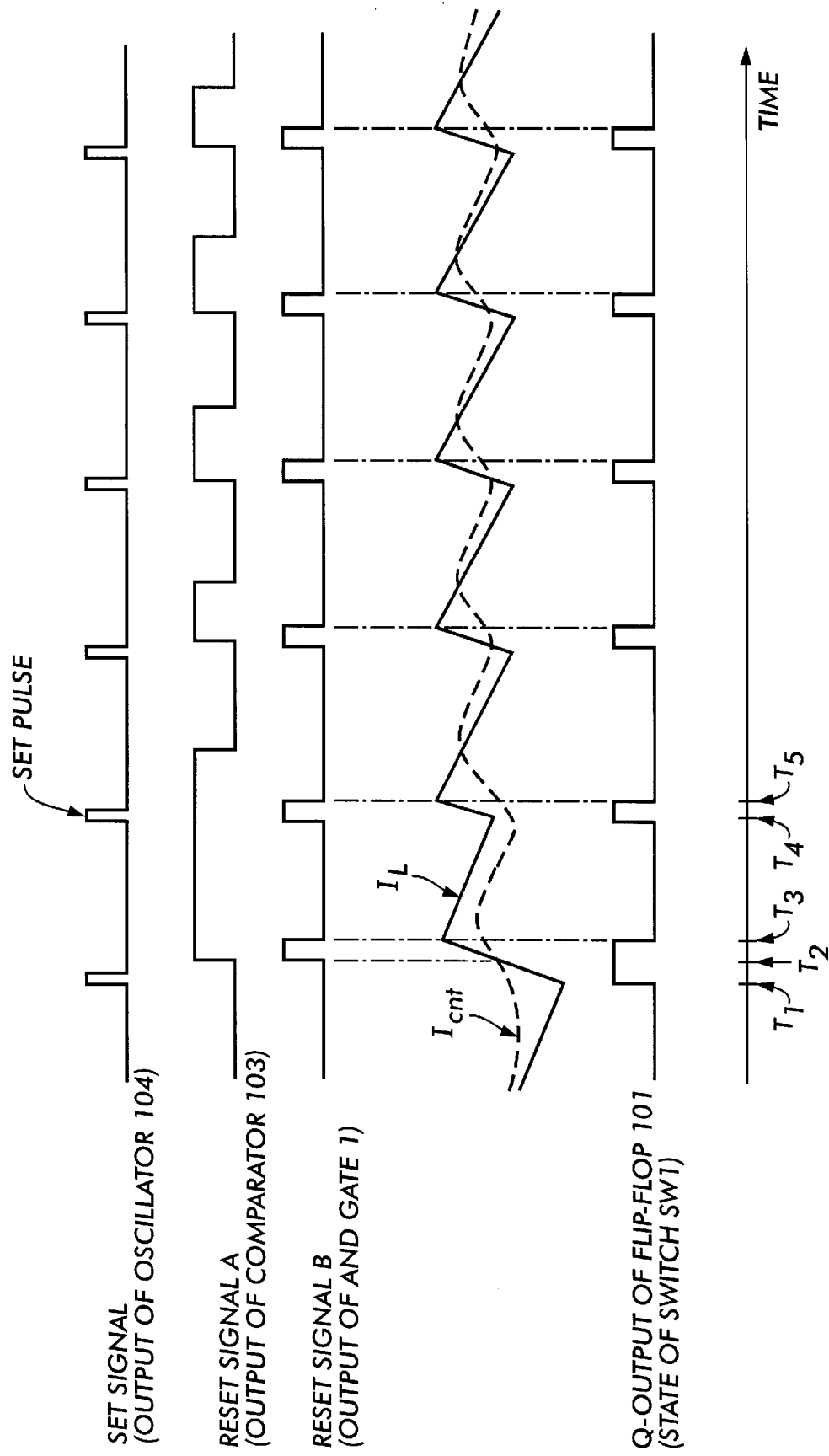
FIG. 4 explains the operations of the DC/DC converter according to the preferred embodiment.

Provided next is the explanation about the operations of the DC/DC converter according to this preferred embodiment, by referring to FIG. 4. In the DC/DC converter according to this preferred embodiment, the configuration to generate the signal for turning on the switch (SW1) intended to supply an electric current to a load, and the configuration to generate the signal for turning off the above described switch when the inductor current IL becomes larger than the instruction value signal $I_{cnt}$ which is determined based on the output voltage $V_{out}$, are the same as those of the conventional DC/DC converter shown in FIG. 1.

The set pulse (this is sometimes recited as a set signal) of the set signal is output from the oscillator 104 at a time $T_4$. This set pulse is input to the set terminal of the flip-flop 101. The AND gate 105 is assumed to be open at the time $T_1$ in this case.

The flip-flop 101 enters the set state according to the set pulse, and its Q-output becomes "H". When the Q-output of the flip-flop 101 becomes "H", the switch SW1 enters the ON state, which leads to an increase in the inductor current IL. Note that the switch SW2 is turned off when the switch SW1 enters the ON state.

When the inductor current IL reaches the instruction value signal $I_{cnt}$ at a time $T_2$, the output (reset signal A) of the comparator 103 is changed from "L" to "H". Since the Q-output of the flip-flop 101 is "H" at this time, the output (reset signal B) of the AND gate 1 is also changed from "L" to "H".

When the reset signal B becomes "H", the AND gate 105 is closed, and at the same time, the flip-flop 101 enters the reset state. When the AND gate 105 is closed, the set signal is prevented from being input to the flip-flop 101. Furthermore, when the flip-flop 101 enters the reset state, its Q-output becomes "L", and the switch SW1 is turned off. When the switch SW1 is turned off, the inductor current IL gradually decreases thereafter. Note that the switch SW2 is turned on when the switch SW1 is turned off.

As described above, however, a delay exists on the path over which the signals are transmitted. Accordingly, after a predetermined amount of time elapses from when the inductor current IL reaches the instruction value signal $I_{cnt}$ at the time $T_2$, the switch SW1 switches from the ON state to the OFF state at the time $T_3$. Consequently, the inductor current IL becomes larger than the instruction value signal $I_{cnt}$ at the time $T_3$.

When the Q-output of the flip-flop 101 becomes "L" at the time $T_3$, the switch SW1 is turned off and the AND gate 1 is closed. As a result, the reset signal A output from the comparator 103 cannot pass through the AND gate 1, and the reset signal B being the output of the AND gate 1 becomes "L". Namely, the reset signal A is substantially canceled or extinguished by the AND gate 1.

When the reset signal B becomes "L", "L" is input to the reset terminal of the flip-flop 101. As a result, the flip-flop 101 enters a state intended to wait for an input of "H" to its set terminal after the time $T_3$. Additionally, when the reset signal B becomes "L", the AND gate 105 is opened. Accordingly, the set pulse of the set signal can pass through the AND gate 105 after the time $T_3$.

Since the switch SW1 is in the OFF state after the time $T_3$, the inductor current IL continues to decrease. The decreasing rate (di/dt) of the inductor current IL considerably low, for example, when the output voltage $V_{out}$ of the DC/DC converter is set to a small value. This was previously described by using the equation (2).

The oscillator 104 generates the next set pulse at the time $T_4$. The inductor current IL remains larger than the instruction value $I_{cnt}$ at the time $T_4$. Therefore, the output (reset signal A) of the comparator 103 is "H".

However, since the Q-output of the flip-flop 101 is "L" at the time $T_4$, the AND gate 1 is closed, so that the reset signal A cannot pass through the AND gate 1. Namely, the reset signal A generated by the comparator 103 is canceled by the AND gate 1. In addition, the AND gate 105 is open and the flip-flop 101 is waiting for the input of "H" to its set terminal at the time $T_4$, as described above. Accordingly, the set pulse of the set signal generated at the time $T_4$ is fed to the set terminal of the flip-flop 101.

When the set pulse of the set signal is fed to the flip-flop 101 at the time $T_4$, the Q-output of the flip-flop 101 becomes "H" and the switch SW1 again enters the ON state. As a result, the inductor current IL continues to increase thereafter. Furthermore, since the Q-output of the flip-flop 101 becomes "H", the AND gate 1 is opened. If the inductor current IL is smaller than the instruction value $I_{cnt}$, subsequent operations become the same as those performed at the times $T_1$ to $T_4$. However, if the inductor current IL is larger than the instruction value $I_{cnt}$ when the Q-output of the flip-flop 101 becomes "H" at the time $T_4$, as shown in FIG. 4, the output (reset signal B) of the AND gate 1 is immediately changed from "L" to "H". By this reset signal B, the flip-flop 101 is reset and its Q-output becomes "L". The Q-output of the flip-flop 101 is changed from "H" to "L" at a time $T_5$ when a predetermined delay time elapses from the time $T_4$.

The operations after the time T5 are the same as the above described operations performed at the times $T_3$ to $T_4$. Namely, the Q-output of the flip-flop 101 first becomes "L", so that the AND gate 1 is closed. Then, the output (reset signal B) of the AND gate 1 becomes "L", so that the flip-flop 101 enters a state intended to wait for an input of "H" to its set terminal. Consequently, the AND gate 105 is opened.

Unlike the conventional DC/DC converter shown in FIG. 1, even if the inductor current IL is larger than the instruction value $I_{cnt}$, a set pulse is sure to be input to the set terminal of the flip-flop 101 when being generated. With this input of the set pulse, the switch SW1 switches from the OFF state to the ON state. As a result, the switch SW1 (and the switch SW2) operates at a predetermined switching frequency which is synchronous with the oscillation frequency of the oscillator 104.

If the switching operations of the switches SW1 and SW2 become stable, also the ripple of the output voltage $V_{out}$ becomes smaller and constant. Because also the frequency of noise occurring when the switches SW1 and SW2 are switched becomes constant, the noise can be eliminated with ease.

By the way, the state where an electric current consumed by a load connected to a DC/DC converter significantly changes may frequently occurs. For example, when the operating mode of a CPU of a personal computer is switched from a normal operating mode to a suspend mode, a consumed electric current sharply decreases. In such a case, the output voltage of the DC/DC converter temporarily rises. Provided below is the explanation about a DC/DC converter equipped with a capability for restoring an output voltage which temporarily rises to a voltage to be held in a short time.

Figure 5:
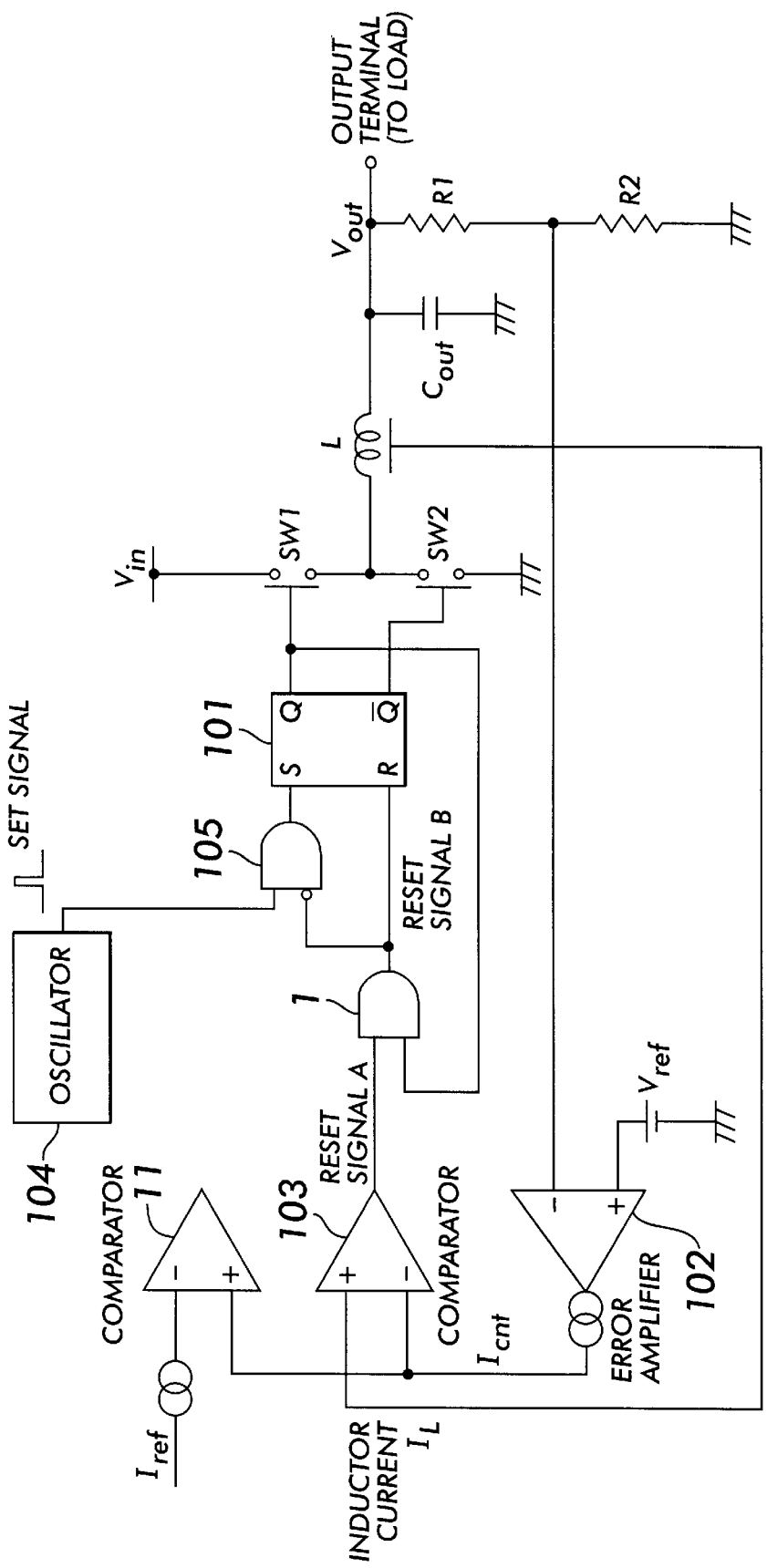
FIG. 5 is a circuit diagram showing the configuration of a DC/DC converter according to another preferred embodiment of the present invention.

FIG. 5 is a circuit diagram showing the configuration of a DC/DC converter according to another preferred embodiment of the present invention. This DC/DC converter is implemented by adding a comparator 11 to the DC/DC converter shown in FIG. 3. The comparator 11 compares the instruction value signal $I_{cnt}$ being the output of the error amplifier 102 with an output voltage monitoring signal $I_{ref}$ of a predetermined level, and feeds its result to the AND gate 105.

In the above described configuration, the instruction value signal $I_{cnt}$ becomes smaller with an increase in the output voltage $V_{out}$. When the instruction value signal $I_{cnt}$ becomes smaller than the output voltage monitoring signal $I_{ref}$, the output of the comparator 11 becomes "L", so that the AND gate 105 is closed. After the AND gate 105 is closed, the set pulse generated by the oscillator 104 is not fed to the flip-flop 101. Namely, when the output voltage $V_{out}$ increases to a voltage equal to or higher than a predetermined value, the set pulse for turning on the switch SW1 is blocked. As a result, an electric current is not supplied to the load, so that the output voltage $V_{out}$ is restored to the voltage to be held in a short time.

Thereafter, when the output voltage $V_{out}$ drops to a predetermined value, the output of the comparator 11 becomes "H" and the state where the set pulse is forcibly canceled is terminated.

Figure 6:
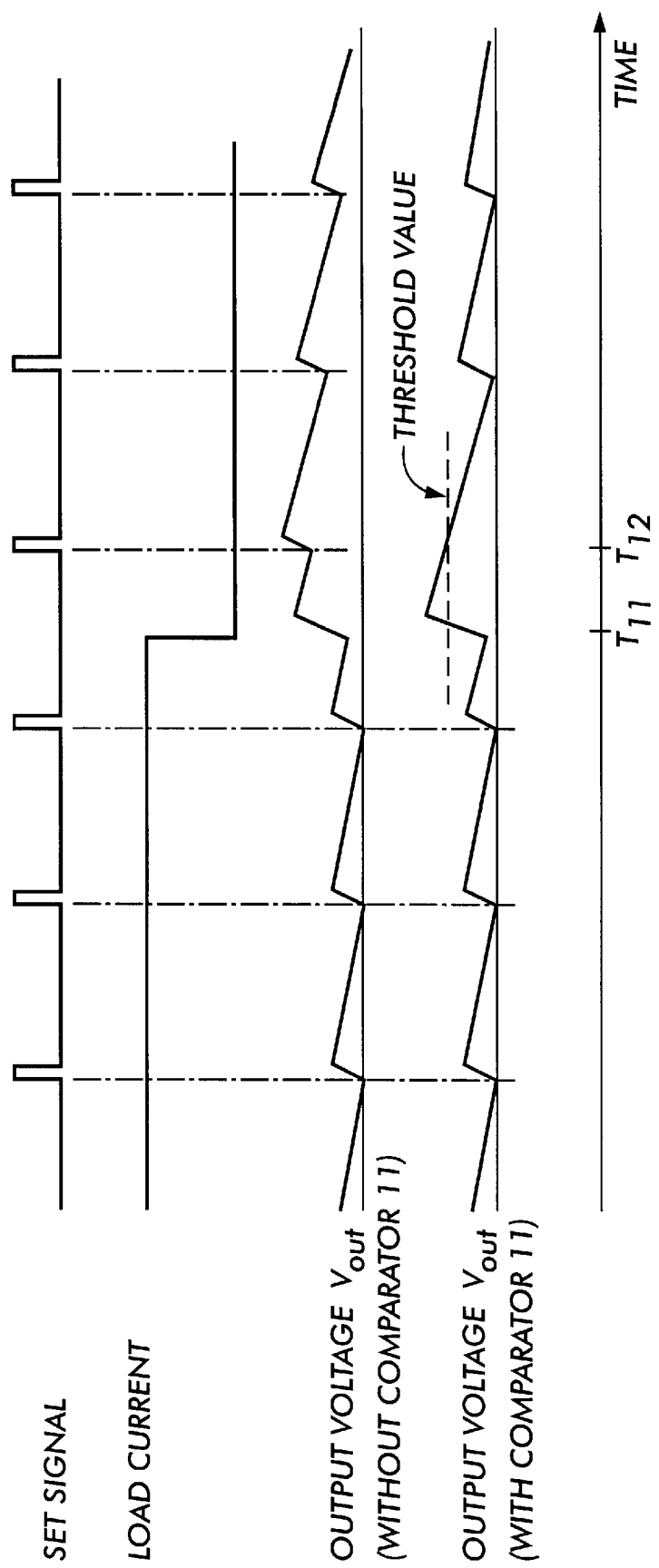
FIG. 6 explains the operations of the DC/DC converter shown in FIG. 5.

FIG. 6 explains the operations of the DC/DC converter shown in FIG. 5. Here, an explanation will be provided by making a comparison between the case where the comparator 11 is not arranged and the case where it is arranged.

Before a time $T_{11}$, the same operations as those explained by referring to FIG. 4 are performed. When a load current suddenly becomes small at the time $T_{11}$, the output voltage $V_{out}$ will increase. In this case, in the configuration where the comparator 11 is not arranged, the switch SW1 is turned on according to a set pulse and an electric current is supplied to the load when the set pulse is generated at a time $T_{12}$. With this electric current, the output voltage $V_{out}$ rises. Accordingly, it takes more time to restore the output voltage $V_{out}$ to the voltage to be held in this case.

In the meantime, in the configuration where the comparator 11 is arranged, a set pulse is not fed to the flip-flop 101 if the value of the output voltage $V_{out}$ is larger than the threshold value determined by the output voltage monitoring signal $I_{ref}$ at the time $T_{12}$. Accordingly, the switch SW1 is not turned on and electric current is not supplied to the load. Consequently, the output voltage $V_{out}$ is prevented from rising, whereby it takes less time to restore the output voltage $V_{out}$ to the voltage to be held.

Note that a circuit for forcibly resetting the flip-flop 101 when an abnormal state of the load current (overcurrent) is detected, may be arranged in the DC/DC converter according to the above described preferred embodiment, although this circuit is not shown in FIG. 5.

Figure 7:
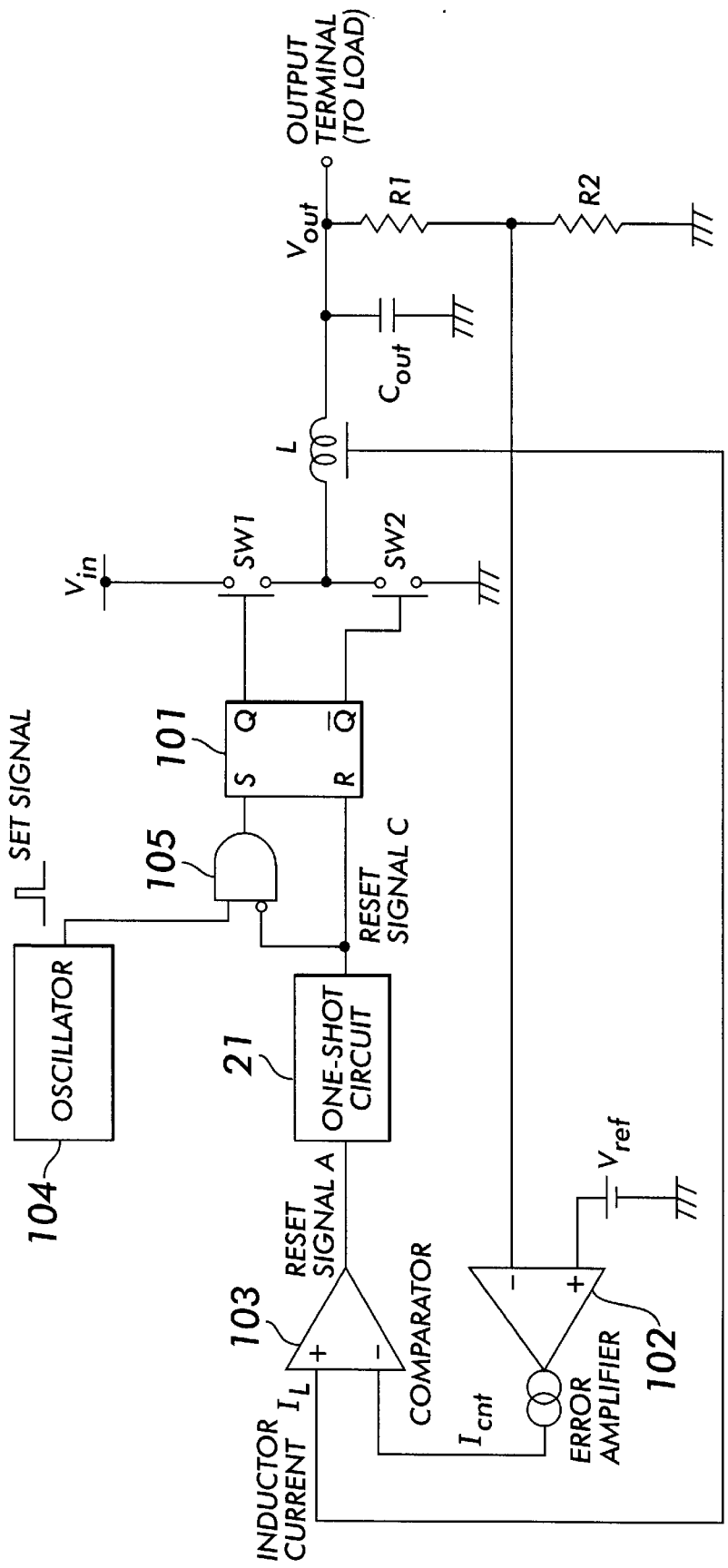
FIG. 7 is a circuit diagram showing the configuration of a DC/DC converter according to a further preferred embodiment of the present invention.

FIG. 7 is a circuit diagram showing the configuration of a DC/DC converter according to a further preferred embodiment. This DC/DC converter has a one-short circuit 21 as a replacement of the AND gate 1 arranged in the DC/DC converter shown in FIG. 3. The one-shot circuit 21 is, for example, a one-shot multi-vibrator, and is intended to receive the output of the comparator 103 and to output "H" upon detection of a rising edge. The duration of "H" output from the one-shot circuit 21 is preset to a predetermined value. The output of the one-shot circuit 21 is fed as a reset signal C to the reset terminal of the flip-flop 101 and the negative logic input terminal of the AND gate 105.

FIG. 8 explains the operations of the DC/DC converter shown in FIG. 7. Here, the one-shot circuit 21 is assumed to output a pulse having a width of $T_w$ upon detection of a rising edge.

As described above, when a set pulse is generated at the time $T_1$, the inductor current IL starts to increase. When the inductor current IL reaches the instruction value signal $I_{cnt}$ at the time $T_2$, the output (reset signal A) of the comparator 103 is changed from "L" to "H". When the output of the comparator 103 is changed from "L" to "H", the one-shot circuit 21 detects a rising edge and outputs a pulse having a width of $T_w$ (reset signal C). With the output of the one-shot circuit 21, the flip-flop 101 is reset and the switch SW1 is turned off. Thereafter, the inductor current IL continues to decrease.

The width $T_w$ of the pulse output from the one-shot circuit 21, namely, the duration during which the output of the one-shot circuit 21 holds "H" is set to a duration shorter than the cycle of the set signal, and the output of the one-shot circuit 21 is changed from "H" to "L" at a time $T_{21}$. That is, the AND gate 105 is open at the time $T_{22}$ being the timing at which the next set pulse is generated. Accordingly, when being generated at the time $T_{22}$, the next set pulse is fed to the flip-flop 101 after passing through the AND gate 105. As a result, the switch SW1 is turned on, which leads to an increase in the inductor current IL. Thereafter, the operations at the times $T_1$ to $T_{22}$ are repeated.

As described above, the one-shot circuit 21 having a time constant which is shorter than the cycle of the oscillator 104 is arranged in the DC/DC converter shown in FIG. 7. Therefore, a set pulse is sure to be input to the set terminal of the flip-flop 101 even if the inductor current IL is larger than the instruction value $I_{cnt}$. Consequently, the same effects as those of the DC/DC converter shown in FIG. 3 can be obtained.

The present invention is also applicable to a DC/DC converter having a configuration such that a diode replaces the switch SW2 in FIG. 3.

According to the present invention, in the DC/DC converter which includes a power supply switch and an inductor arranged between the power supply switch and output terminal, the switching interval of the power supply switch is made constant regardless of an electric current flowing via the inductor, whereby the ripple of an output voltage becomes small and noise can be eliminated with ease.

Additionally, according to the present invention, the power supply switch is configured not to be turned on when an output voltage temporarily rises, whereby the output voltage is restored to a voltage to be held in a short time.

What is claimed is:

1. A DC/DC converter having a power supply switch and an inductor arranged between the power supply switch and an output terminal, comprising:

a latch circuit which holds either a first state intended to turn on the power supply switch or a second state intended to turn off the power supply switch;

a set signal generator which generates a set signal intended to make said latch circuit enter the first state;

a reset signal generator which generates a reset signal intended to make said latch enter the second state when an electric current flowing via the inductor becomes larger than an instruction value determined based on an output voltage; and a canceling circuit which cancels the reset signal independent of the output voltage of said DC/DC converter immediately after a state held by said latch circuit is changed from the first state to the second state.

2. The DC/DC converter according to claim 1, further comprising:

a blocking circuit which prevents the set signal from being input to said latch circuit while the reset signal exists.

3. The DC/DC converter according to claim 1, further comprising:

a blocking circuit which prevents the set signal from being input to said latch circuit while the output voltage is larger than a predetermined value.

4. The DC/DC converter according to claim 1, wherein said set signal generator generates the set signal at a predetermined cycle.

5. A DC/DC converter having a power supply switch and an inductor arranged between the power supply switch and an output terminal, comprising:

a latch means for holding either a first state intended to turn on the power supply switch or a second state intended to turn off the power supply switch;

a set signal generating means for generating a set signal intended to make said latch circuit enter the first state;

a reset signal generating means for generating a reset signal intended to make said latch enter the second state when an electric current flowing via the inductor becomes larger than an instruction value determined based on an output voltage; and cancel means for canceling the reset signal independent of the output voltage of said DC/DC converter immediately after a state held by said latch circuit is changed from the first state to the second state.

6. A DC/DC converter having a power supply switch and an inductor arranged between the power supply switch and an output terminal, comprising:

a latch circuit which holds either a first state intended to turn on the power supply switch or a second state intended to turn off the power supply switch;

a set signal generator which generates a set signal intended to make said latch circuit enter the first state;

a reset signal generator which outputs a reset signal having a predetermined duration to said latch, the reset signal being intended to make said latch circuit enter the second state, and being output by the reset signal generator when an electric current flowing via the inductor becomes larger than an instruction value determined based on the output voltage.

7. The DC/DC converter according to claim 6, wherein:

said set signal generator generates the set signal at a predetermined cycle; and the duration during which the reset signal is output by said reset signal generator is shorter than the cycle.

8. A controlling circuit for controlling an output voltage of a DC/DC converter, which has a power supply switch and an inductor arranged between the power supply switch and an output terminal, said controlling circuit comprising:

a latch circuit which holds either a first state intended to turn on the power supply switch or a second state intended to turn off the power supply switch;

a set signal generator which generates a set signal intended to make said latch circuit enter the first state;

a reset signal generator which outputs a reset signal intended to make said latch circuit enter the second state, when an electric current flowing via the inductor becomes larger than an instruction value determined based on an output voltage; and a canceling circuit which cancels the reset signal independent of the output voltage of said DC/DC converter immediately after a state held by said latch circuit is changed from the first state to the second state.

9. The controlling circuit according to claim 8, further comprising:

a priority circuit which feeds the reset signal to said latch circuit, if both the set signal and the reset signal simultaneously exist.

10. A controlling method for controlling an output voltage of a DC/DC converter which has a power supply switch, and an inductor arranged between the power supply converter which has a power supply switch, and an inductor arranged between the power supply switch and an output terminal, and a latch circuit for holding either a first state intended to turn on the power supply switch or a second state intended to turn off the power supply switch, comprising the steps of:

generating a set signal for making said latch circuit enter the first state;

generating a reset signal for making said latch circuit enter the second state when an electric current flowing via the inductor becomes larger than an instruction value determined based on an output voltage; and canceling the reset signal independent of the output voltage of said DC/DC converter immediately after a state held by said latch circuit is changed from the first state to the second state.

* * * * *

UNITED STATES PATENT AND TRADEMARK OFFICE
CERTIFICATE OF CORRECTION

PATENT NO. : 6,163,142  Page 1 of 1
DATED : December 19, 2000
INVENTOR(S) : Tsujimoto It is certified that error appears in the above-identified patent and that said Letters Patent is hereby corrected as shown below:

Column 2,
Line 17, after "the", delete "A".
Line 53, after "di/dt", insert -- $\propto$ --.
Line 53, before "(1)", insert -- --- --.
Line 25, delete "flop-flop" and insert therefor -- flip-flop --.

Column 3,
Line 2, after "di/dt", insert -- $\propto$ --.
Line 12, before "(2)", insert -- --- --.

Column 4,
Line 64, delete "flop-flop" and insert therefor -- flip-flop --.

Column 5,
Line 1, delete "flop-flop" and insert therefor -- flip-flop --.

Signed and Sealed this

Fourteenth Day of January, 2003

JAMES E. ROGAN
*Director of the United States Patent and Trademark Office*